United States Patent
Li et al.

(10) Patent No.: US 10,873,066 B2
(45) Date of Patent: Dec. 22, 2020

(54) VENT FOR SECONDARY BATTERY TOP COVER, TOP COVER ASSEMBLY, AND SECONDARY BATTERY

(71) Applicant: Contemporary Amperex Technology Co., Limited, Ningde (CN)

(72) Inventors: Xiang Li, Ningde (CN); Peng Wang, Ningde (CN); Chengyou Xing, Ningde (CN); Rulai Cai, Ningde (CN)

(73) Assignee: Contemporary Amperex Technology Co., Limited, Fujian (CN)

( * ) Notice: Subject to any disclaimer, the term of this patent is extended or adjusted under 35 U.S.C. 154(b) by 80 days.

(21) Appl. No.: 16/058,510

(22) Filed: Aug. 8, 2018

(65) Prior Publication Data

US 2019/0214619 A1 Jul. 11, 2019

(30) Foreign Application Priority Data

Jan. 9, 2018 (CN) ............................ 2018 1 0020462

(51) Int. Cl.
*H01M 2/12* (2006.01)
*H01M 10/0525* (2010.01)

(52) U.S. Cl.
CPC ........... *H01M 2/1241* (2013.01); *H01M 2/12* (2013.01); *H01M 10/0525* (2013.01); *H01M 2220/20* (2013.01)

(58) Field of Classification Search
CPC ..................................................... H01M 2/12
See application file for complete search history.

(56) References Cited

U.S. PATENT DOCUMENTS

2015/0024241 A1* 1/2015 Kim .................... H01M 2/0404
429/56

FOREIGN PATENT DOCUMENTS

| EP | 2418711 A2 | 2/2012 |
|---|---|---|
| JP | 2005071836 | 3/2005 |
| JP | 2008235082 A | 10/2008 |

* cited by examiner

*Primary Examiner* — Ladan Mohaddes
(74) *Attorney, Agent, or Firm* — Forge IP, PLLC

(57) ABSTRACT

The present disclosure relates to a vent for a secondary battery top cover, a top cover assembly, a secondary battery and a vehicle. The vent includes a flat base and a protrusion protruding outward with respect to flat base. The protrusion has a main nick and at least one branch nick connected to at least one end of the main nick. An angle formed between the main nick and the branch nick is more than zero. When the pressure inside the case increases excessively, gas causes stress concentration at the protrusion such that the vent is torn along the main nick and the at least one branch nick, thereby releasing the gas in the case, reducing explosion risk of the secondary battery, and improving safety of the secondary battery.

8 Claims, 4 Drawing Sheets

VENT FOR SECONDARY BATTERY TOP COVER, TOP COVER ASSEMBLY, AND SECONDARY BATTERY

CROSS-REFERENCE TO RELATED APPLICATIONS

The present disclosure claims priority to Chinese Patent Application No. 201810020462.8, filed on Jan. 9, 2018, the content of which is incorporated herein by reference in its entirety.

TECHNICAL FIELD

The present disclosure relates to the technical field of energy storage devices, and in particular, to a vent for a secondary battery top cover, a top cover assembly, and a secondary battery.

BACKGROUND

Secondary batteries can be charged and discharged. If a secondary battery is under the following conditions, such as being overcharged, electrode plate pierced by metal conductor, and performing hot box test, heats and gas can be rapidly accumulated inside the secondary battery, and thus internal pressure of the secondary battery increases, causing severe accidents of the secondary battery such as expansion, or even explosion.

The secondary battery is usually provided with a vent. Once the internal pressure of the secondary battery reaches a pressure of opening the vent, the internal gas will be released through the vent, thereby avoiding dangerous accidents such as explosion of the secondary battery.

SUMMARY

The present disclosure provides a vent for a secondary battery. The secondary battery includes a flat base and a protrusion protruding outward with respect to the flat base. The protrusion is provided with a main nick and at least one branch nick connected to at least one end of the main nick, and an angle formed between the main nick and the branch nick is more than zero.

Optionally, the protrusion has a ridge-like sharp corner, and an inner surface of the protrusion forms a recessed portion having a shape corresponding to the protrusion.

Optionally, the main nick and the branch nick are both provided on an outer surface of the ridge-like sharp corner, and/or the main nick and the branch nick are both provided on an inner surface of the ridge-like sharp corner.

Optionally, there are two branch nicks connected to one of the end of the main nick, and the main nick and the two branch nicks are in a Y-shape.

Optionally, the two branch nicks are symmetrical with respect to the main nick.

Optionally, the vent according to claim 4, wherein each of two ends of the main nick is connected to the two branch nicks.

Optionally, the angle formed between the main nick and the branch nick is within a range of 120°-150°.

Optionally, a length of the main nick is 1.5-2.5 times a length of the branch nick.

Optionally, the vent further comprises a transition part, the protrusion is connected to the flat base via the transition part, and the transition part is inclined relative to the flat base.

Optionally, an inclined angle of the transition part is within a range of 2°-15°.

The present disclosure also provides a secondary battery top cover assembly. The secondary battery top cover assembly includes a top cover plate and a vent connected to the top cover plate. The vent is the above vent.

The present disclosure also provides a secondary battery. The secondary battery includes an electrode assembly, a case having an opening, and the secondary battery top cover assembly described above. The secondary battery top cover assembly is connected to the opening of the case to form an enclosed space, in which the electrode assembly is enclosed, and the protrusion protrudes toward a direction away from the electrode assembly.

The technical solutions provided by the present disclosure can achieve the following beneficial effects.

The present disclosure provides a vent for a secondary battery top cover assembly. The vent includes a protrusion that protrudes outward with respect to the flat base. The protrusion is provided with a main nick and at least one branch nick connected to the main nick. When pressure inside the case increases excessively, gas causes stress concentration at the protrusion and the vent is torn along the main nick and the at least one branch nick, so that gas in the case is released, thereby reducing explosion risk in the secondary battery and improving safety of the secondary battery.

It should be understood that the above general description and the following detailed description are merely illustrative, and do not limit the present disclosure.

REFERENCE SIGNS

1000—secondary battery;
100—case;
200—top cover assembly;
202—top cover plate;
202a—anti-explosion opening;
204—first terminal plate;
206—second terminal plate;
208—vent;
2082—edge connecting portion;
2084—central exhaust portion;
20842—flat base;
20844—protrusion;
20844a—main nick;
20844b—branch nick;
20846—transition part;
300—electrode assembly;

302—first electrode tab;
304—second electrode tab;
400—insulation film;
500—first electric collector;
502—first electrode tab connecting portion;
600—second electric collector;
602—second electrode tab connecting portion.

The accompanying drawings, which are incorporated in and constitute a part of this specification, illustrate embodiments according to the present disclosure, and together with the specification serve to explain the principles of the present disclosure.

DESCRIPTION OF EMBODIMENTS

The present disclosure will be described in detail as follows by aid of embodiments and with reference to the accompanying drawings.

It should be noted that, the expressions such as "upper", "lower", "left", "right" and the like in embodiments of the present disclosure are described with reference to the position and direction in the accompanying drawings, and should not be construed as limitations of the embodiments of the present disclosure. In addition, it should also be understood that, when an element is referred to as being "on" or "under" another element, it may be directly on or under the other element, or one or more intervening elements may also be present.

Figure 1:
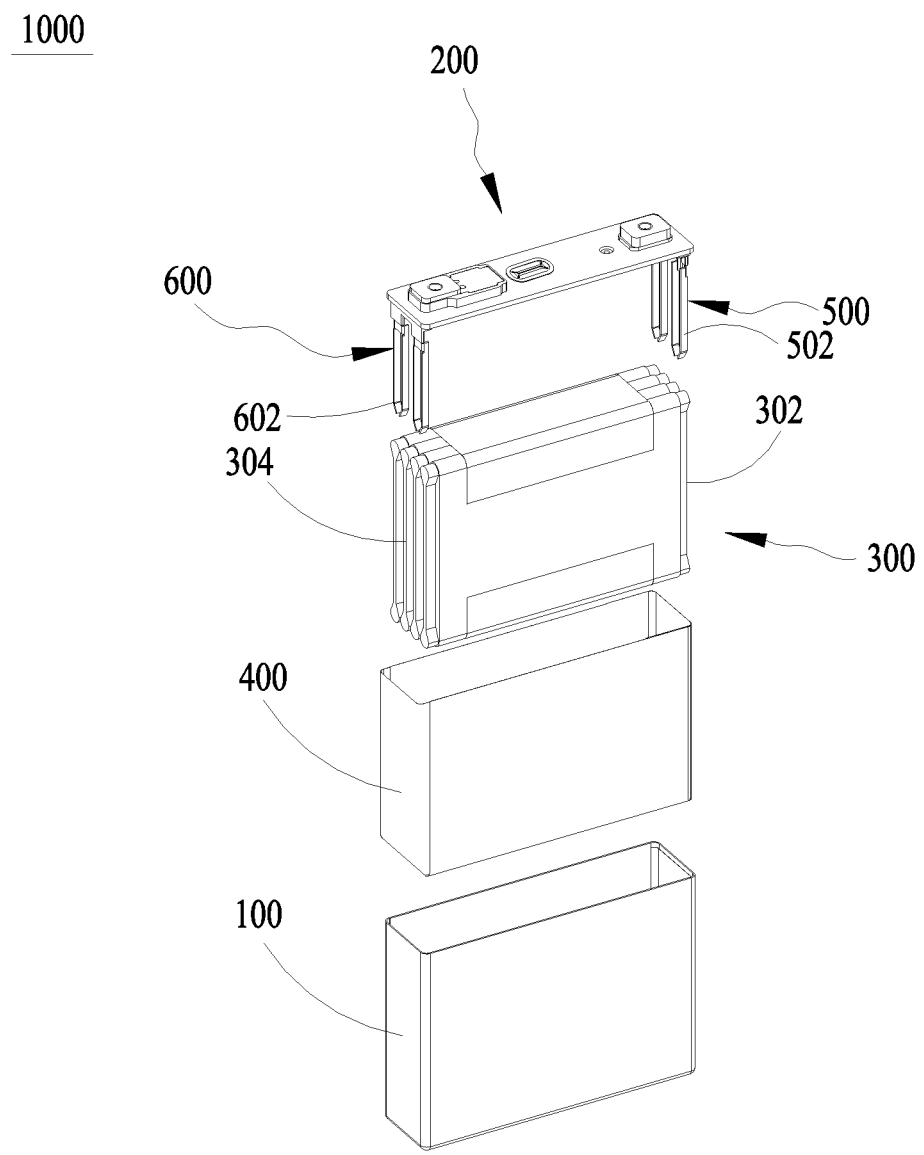
FIG. 1 is an exploded view of a secondary battery according to an embodiment of the present disclosure.

FIG. 1 is an exploded view of a secondary battery.

The secondary battery 1000 includes a case 100, a secondary battery top cover assembly 200 (hereinafter referred to as a top cover assembly), an electrode assembly 300, and an insulation film 400. The electrode assembly 300 and the insulation film 400 are accommodated in the case 100, and the electrode assembly 300 is wrapped by the insulation film 400. The case 100 has an opening that can be sealed by the top cover assembly 200. The top cover assembly 200 and the case 100 can be connected, such as welded to each other at the positions where they contact.

The electrode assembly 300 is made by winding or laminating a first electrode plate, a second electrode plate, and a separator for separating the first electrode plate from the second electrode plate. Here, the first electrode plate may be used as a negative electrode plate, and the second electrode plate may be used as a positive electrode plate, and vice versa.

The first electrode plate and the second electrode plate both include a coated-portion coated with an active material and an uncoated-portion uncoated with the active material. The first electrode plate and the second electrode plate can be coated with different materials, thus the first electrode plate and the second electrode plate can have different polarities.

For example, the first electrode plate is a positive electrode plate, and the active material coated on the positive electrode plate may be lithium iron phosphate, lithium cobaltate, lithium manganate, and the like; the second electrode plate is a negative electrode plate, and the active material coated on the negative electrode plate may be carbon or silicon. The uncoated-portion of the first electrode plate is used as a first electrode tab 302, and the uncoated-portion of the second electrode plate is used as a second electrode tab 304.

The secondary battery further includes a first current collector 500 and a second current collector 600. The first electrode plate and the second electrode plate of the electrode assembly 300 may be connected to the first current collector 500 and the second current collector 600, respectively. The first current collector 500 is made of a conductive material and is connected to the first electrode tab 302 at one end of the electrode assembly 300 so as to be connected to the first electrode plate.

The first current collector 500 includes a first terminal connecting portion and a first electrode plate connecting portion 502. The first electrode plate connecting portion 502 is connected to the first electrode tab 302, and the first terminal connecting portion is connected to a first electrode terminal (not shown) of the top cover assembly 200. The first terminal connecting portion is provided with a connecting hole, which is matched with the first electrode terminal, so that the first electrode terminal can be accommodated in the connecting hole. The first electrode terminal and the first terminal connecting portion are connected to each other, for example, by welding.

The second current collector 600 is made of a conductive material and is connected to the second electrode tab 304 at one end of the electrode assembly 300 so as to be connected to the second electrode plate.

The second current collector 600 includes a second terminal connecting portion and a second electrode plate connecting portion 602. The second electrode plate connecting portion 602 is connected to the second electrode tab 304, and the second terminal connecting portion is connected to a second electrode terminal (not shown) of the top cover assembly 200.

The second terminal connecting portion is provided with a connecting hole, which is matched with the second electrode terminal, so that the second electrode terminal can be accommodated in the connecting hole. The second electrode terminal and the second terminal connecting portion are connected to each other, for example, by welding.

It should be noted that, although FIG. 1 shows that the first electrode tab 302 and the second electrode tab 304 laterally protrude from the electrode assembly 300, the structure of the electrode assembly 300 is not limited thereto.

Figure 2:
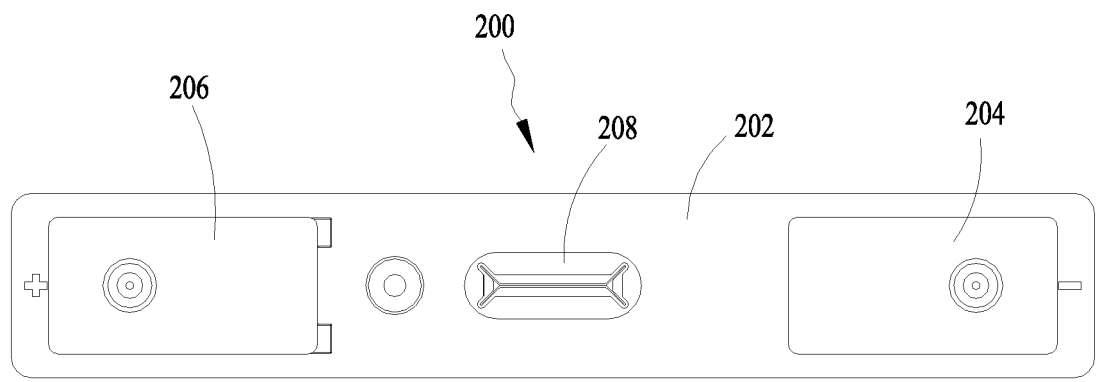
FIG. 2 is a top view of a secondary battery top cover assembly according to an embodiment of the present disclosure.

FIG. 2 is a top view of a top cover assembly.

The top cover assembly 200 includes a top cover plate 202, a first electrode terminal and a second electrode terminal (not shown). The top cover plate 202 is provided with terminal holes (not shown) so as to allow the first electrode terminal and the second electrode terminal to protrude outward. For example, a portion of the first electrode terminal protruding from the top cover plate 202 is connected to the first terminal plate 204 and further connected to an external conductive terminal.

Similarly, a portion of the second electrode terminal protruding from the top cover plate 202 is connected to the second terminal plate 206.

The top cover assembly 200 further includes a vent 208. The vent is connected to the top cover plate 202 approximately at a central portion of the top cover plate 202.

Figure 3:
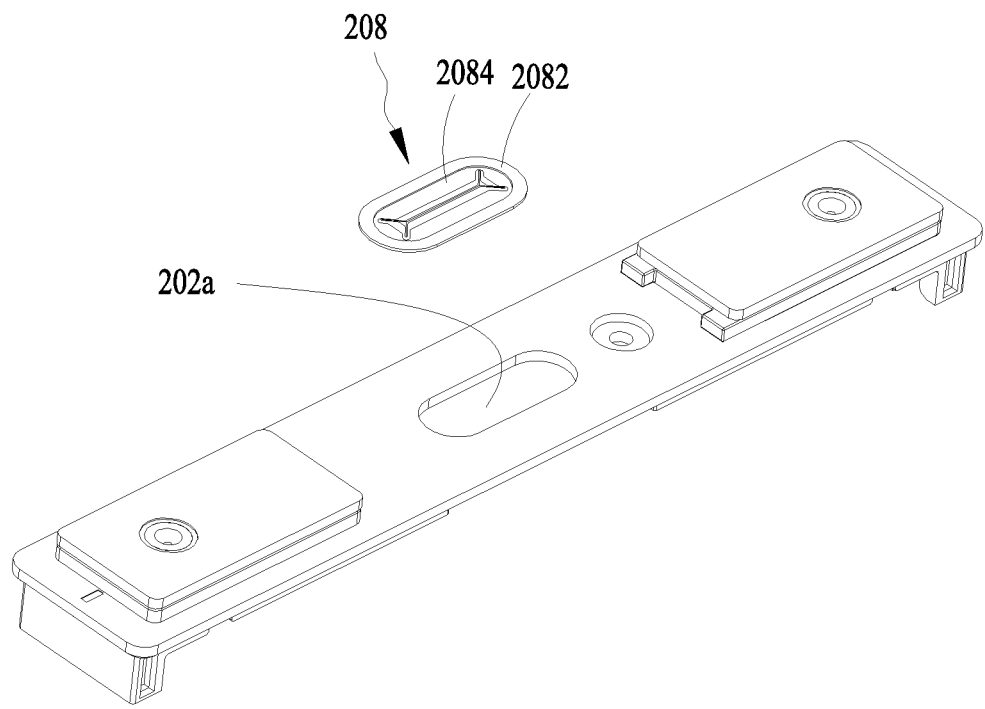
FIG. 3 is an exploded view of a top cover assembly of a secondary battery according to an embodiment of the present disclosure.

FIG. 3 shows an exploded view of a top cover assembly.

The top cover plate 202 is provided with an anti-explosion opening 202a, and the vent 208 seals the anti-explosion opening 202a. For example, the anti-explosion opening 202a is configured as an oblong opening, and the contour of the vent 208 is matched with the contour of the anti-explosion opening 202a. The vent 208 includes an edge connecting portion 2082 and a central exhaust portion 2084. The edge connecting portion 2082 is hermetically connected to the top cover plate 202 and is connected to perimeter of the anti-explosion opening 202a, and the central exhaust portion 2084 is used to release the gas inside the case 100 after being torn.

In an embodiment, the edge connecting portion 2082 may have a greater thickness than a thickness of the central exhaust portion 2084, so as to form a more reliable connection between the edge connecting portion 2082 and the top cover plate 202. The edge connecting portion 2082 is connected to an inner side surface of the top cover plate 202, and the connection implemented by welding, such as laser welding.

Figure 4:
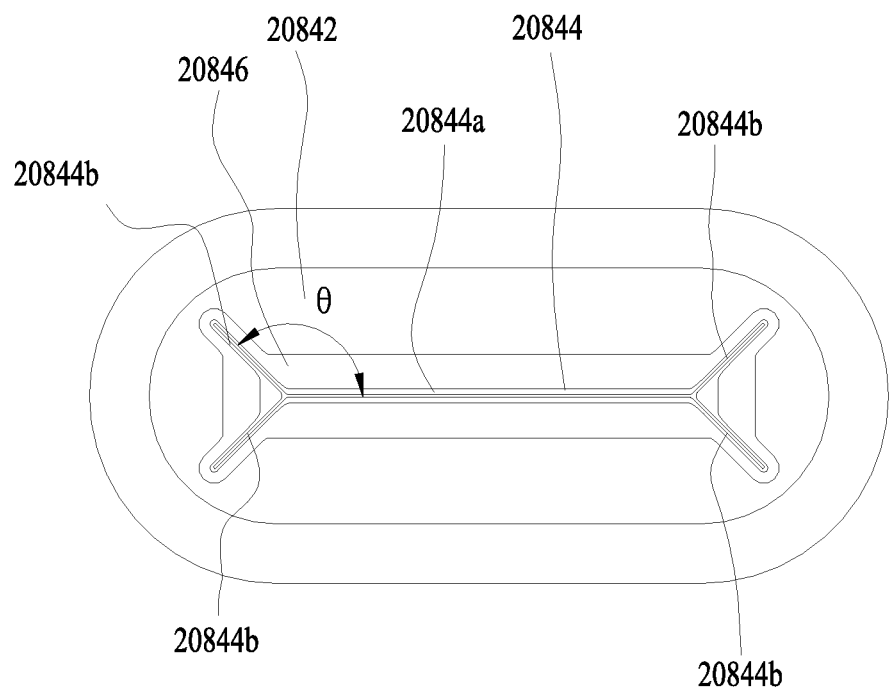
FIG. 4 is a schematic diagram of a vent of a top cover assembly according to an embodiment of the present disclosure.

FIG. 4 shows a top view of the vent.

The central exhaust portion 2084 includes a flat base 20842 and a protrusion 20844 that protrudes outward with respect to the flat base 20842. The flat base 20842 has a flat surface, and the protrusion 20844 protrudes from the flat base 20842 in a direction away from the electrode assembly 300 (protrudes toward outside of the top cover assembly 200) so as to form a protruding structure.

A main nick 20844a and branch nicks 20844b connected to ends of the main nick 20844a are provided on the protrusion 20844. The main nick 20844a extends along a longitudinal direction of the oblong vent 208. An angle formed between the branch nick 20844b and the main nick 20844a is more than zero. When case 100 has an internal pressure greater than a preset pressure (e.g., in a case of that gas is over-produced due to overcharging), the main nick 20844a and the branch nicks 20844b can be opened faster than other positions of the case 100, so as to form an opening for releasing the gas. The gas inside the case 100 can be quickly released through the opening, so as to lower internal pressure of the case 100, thereby reducing the risk of explosion of the secondary battery.

Figure 5:
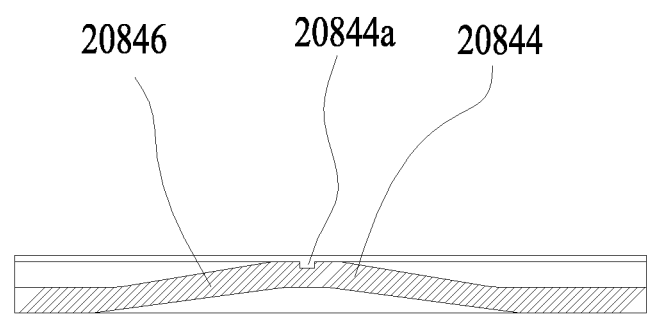
FIG. 5 is a partial cross-section view of a vent according to an embodiment of the present disclosure.

FIG. 5 is a cross-section view of a vent.

The protrusion 20844 protrudes toward a direction away from internal space of case 100 and is formed as a ridge-like shape. Both the main nick 20844a and the branch nicks 20844b are disposed at an outer surface of the ridge-like sharp corner. Since a recessed portion is correspondingly formed at the inner surface of the protrusion 20844, when the internal pressure in the case 100 is great enough, the internal pressure in the case 100 can be concentrated on the recessed portion, i.e., the outer surface of the ridge-like sharp corner. At this moment, the main nick 20844a and branch nicks 20844b arranged at the outer surface of the protrusion 20844 can be fast torn under the preset pressure, instantaneously responding to excessively increased gas pressure in the case 100.

Figure 6:
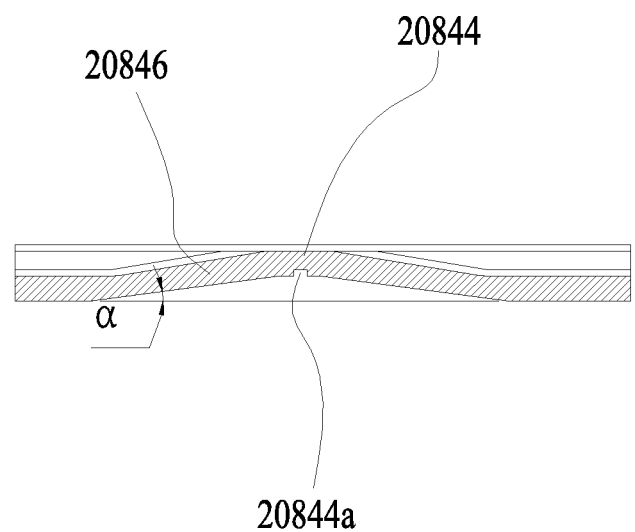
FIG. 6 is a partial cross-section view of a vent according to another embodiment of the present disclosure.

Optionally, with reference to FIG. 6, the main nick 20844a and branch nicks 20844b also can be provided at inner surface of the protrusion 20844 facing the electrode assembly 300, i.e., at an inner surface of the ridge-like sharp corner. Similarly, gas accumulates in the recessed portion under the effect of the internal pressure of the case 100, stress concentration is formed at the main nick 20844a and the branch nicks 20844b, and the gas jets quickly once the main nick 20844a and branch nicks 20844b are torn.

It is known that the protrusion 20844 protrudes outward with respect to flat base 20842, rather than protruding toward the internal space of case 100. This arrangement is aimed to prevent a fatigue fracture after repeated expansions of the central exhaust portion 2084 under the internal pressure, and also to prevent a decrease of the opening pressure of the vent 280.

With reference to FIG. 4, in order to increase opening area at position of the main nick 20844a and the branch nick 20844b after being torn, two branch nicks 20844b can be provided at a same end of the main nick 20844a. In this case, the two branch nicks 20844b and the main nick 20844a can be in an approximately Y-shaped nick. The Y-shaped nick can increase the opening area after being torn, and then increase the gas flow during exhaust.

Further, in order to quickly open the vent 208, both ends of the main nick 20844a can be formed in Y-shaped nick, respectively, i.e., each end of the main nick 20844a is connected to two branch nicks 20844b. In this case, both ends of the main nick 20844a form two intersections with branch nicks 20844b, so that the central exhaust portion 2084 can be torn first at the two intersections and rapidly form an opening that communicates with and penetrates the flat base 20842. At this moment, the opening allows greater gas releasing to release the pressure inside the case 100.

The two branch nicks 20844b disposed at a same end of the main nick 20844a can be arranged symmetrically about a straight line where the main nick 20844a is located. In this way, each branch nick 20844b has a same length and forms a same angle with the main nick 20844a. Under the effect of the internal pressure of case 100, the intersection between the two branch nicks 20844b and the end of the main nick 20844a is a tearing point. Stared with the tearing point, the central exhaust portion 2084 can be torn synchronously along the two branch nicks 20844b and the main nick 20844a until the tearing opening is fully opened, thereby shortening time of the exhaust of the case 100 and improving the safety of the secondary battery.

According to an embodiment, an angle θ formed between each branch nick 20844b and the main nick 20844a can be within a range of 120° to 150°. Through analysis, it is known that in this range, when tearing opening extends along the main nick 20844a and the two branch nicks 20844b from the intersection of the three nicks, the opening can be synchronized when the angles between any two of the three nicks are equal to one another. The reason lies in that, when the gas jets quickly, stress concentration occurs at the intersection of the three nicks, the intersection is firstly opened, and the opening spreads radially to the central exhaust portion 2084 from the intersection as a center point, so that the impacts of the gas applied to the three nicks are basically the same when angles formed between any two of the three nicks are approximately equal, and the three nicks can be synchronically torn under the same impact of gas.

In an embodiment, the angle formed between each branch nick 20844b and the main nick 20844a can be further within a range of 130°-140°. In this case, angles formed between any two of the three nicks tend to be much close. When the central exhaust portion 2084 is torn at the nicks, tearing process of each branch nick 20844b and the main nick 20844a will be faster and smoother, and the tearing area will be larger.

On the other hand, for improving synchronization of the tearing, in the present disclosure, it is further provided that a length of the main nick 20844a is 1.5-2.5 times a length of the branch nick 20844b. The length of the main nick 20844a refers to a length of the main nick 20844a along its extending direction (as shown in FIG. 2, the extending direction of the main nick 20844a is parallel to a longitudinal direction of the top cover plate). The length of the branch nick 20844b refers to a length of the branch nick 20844b along its extending direction (as shown in FIG. 2, the extending direction of the branch nick 20844b is inclined at a non-zero angle with respect to the extending direction of the branch nick 20844b). As regards the solution in which branch nicks 20844b are provided at both ends of the main nick 20844a, two tearing starting points will be opened at the same time.

At each tearing starting point, if the tearing extends along three nicks having an approximately equal length, i.e., three tearing paths are substantially equal to one another, the two Y-shaped nicks on both ends are torn almost simultaneously and in an approximately equal time, thereby reducing the time of fully opening the vent 208.

In an embodiment, the length of main nick 20844*a* may be 1.8-2.2 times the length of the branch nick 20844*b*. In this way, the lengths of the main nick 20844*a* and the two branch nicks 20844*b* that intersect at the same tearing starting point tend to be much closer, and the opening synchronization of the two Y-shaped nicks is better.

With reference to FIG. 4, the central exhaust portion 2084 further includes a transition part 20846. The protrusion 20844 is connected to the flat base 20842 via the transition part 20846. The transition part 20846 is inclined with respect to the flat base 20842. The transition part 20846 assists the protrusion 20844 to gradually protrude with respect to the flat base 20842 and form a gradually increasing ridge-like protrusion. Meanwhile, the transition part 20846 may also guide gas in the case 100 to accumulate toward the recessed portion and eventually form a stress concentration that causes the tearing of the main nick 20844*a* and the branch nick 20844*b* in the recessed portion.

In an embodiment, the transition part 20846 is inclined at an angle α with respect to the flat base 20842, the angle α can be in a range of 2° to 15° (as shown in FIG. 6). The vent 208 may be formed by a stamping process, and the transition part 20846 may assist the protrusion 20844 to protrude to a preset height relative to the flat base 20842. Meanwhile, the transition part 20846 may improve the processability of the protrusion 20844, thereby preventing rupture of the central exhaust portion 2084 due to excessive protruding of the protrusion 20844.

In an embodiment, the inclined angle α of the transition part 20846 may be in a range of 3° to 6°.

The present disclosure further provides a vehicle. The vehicle includes the secondary battery according to any of the embodiments described above.

The above-described embodiments are merely preferred embodiments of the present disclosure, but not intended to limit the present disclosure. Those skilled in the art may make possible changes and modifications without departing from the concept of the present disclosure. Therefore, the protection scope of the present disclosure is defined by the attached claims.

What is claimed is:

1. A vent for a secondary battery, comprising a flat base and a protrusion protruding outwardly from the flat base in a direction facing away from the secondary battery with respect to the flat base,
    wherein the protrusion is provided with a main nick and at least one branch nick connected to at least one end of the main nick, and an angle formed between the main nick and the at least one branch nick is more than zero, the protrusion has a ridge-shaped sharp corner, and an inner surface of the protrusion forms a recessed portion having a shape corresponding to the protrusion, and
    the main nick and the at least one branch nick are provided on an outer surface and an inner surface of the ridge-shaped sharp corner,
    wherein the vent further comprises a transition part, the protrusion is connected to the flat base via the transition part, and the transition part is inclined relative to the flat base; wherein an inclined angle of the transition part is within a range of 2°-15°.

2. The vent according to claim 1, wherein there are two branch nicks connected to one of the end of the main nick, and the main nick and the two branch nicks are in a Y-shape.

3. The vent according to claim 2, wherein the two branch nicks are symmetrical with respect to the main nick.

4. The vent according to claim 2, wherein each of two ends of the main nick is connected to the two branch nicks.

5. The vent according to claim 1, wherein the angle formed between the main nick and the at least one branch nick is within a range of 120°-150°.

6. The vent according to claim 1, wherein a length of the main nick is 1.5-2.5 times a length of each of the at least one branch nick.

7. A secondary battery top cover assembly, comprising a top cover plate and a vent connected to the top cover plate, wherein the vent is the vent according to claim 1.

8. A secondary battery, comprising:
    an electrode assembly;
    a case having an opening; and
    the secondary battery top cover assembly according to claim 7,
    wherein the secondary battery top cover assembly is connected to the opening of the case to form an enclosed space, in which the electrode assembly is enclosed, and the protrusion protrudes toward a direction away from the electrode assembly.

\* \* \* \* \*